United States Patent
Bailey et al.

(10) Patent No.: US 6,760,913 B1
(45) Date of Patent: Jul. 6, 2004

(54) DATA PROCESSING WITH POLICED OBJECT UNION

(75) Inventors: Nicholas Raymond Bailey, Southampton (GB); Robert Harris, Christchurch (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/542,781

(22) Filed: Apr. 4, 2000

(30) Foreign Application Priority Data

Jun. 25, 1999 (GB) ............................................ 9914819

(51) Int. Cl.[7] ................................................ G06F 9/00
(52) U.S. Cl. ...................... 719/316; 717/116
(58) Field of Search .............................. 709/100, 331, 709/332; 717/108, 116–117, 136–147; 719/316

(56) References Cited

U.S. PATENT DOCUMENTS

| | | | |
|---|---|---|---|
| 5,404,525 A | 4/1995 | Endicott | 395/700 |
| 5,701,485 A | 12/1997 | Guillen | 395/683 |
| 5,768,588 A | 6/1998 | Endicott | 395/683 |
| 5,848,232 A | 12/1998 | Lermuzeaux | 395/187.01 |
| 6,044,224 A * | 3/2000 | Radia et al. | 395/710 |
| 6,142,684 A * | 11/2000 | Kirshenbaum et al. | |
| 6,243,764 B1 * | 6/2001 | Leach et al. | 709/316 |
| 6,349,343 B1 * | 2/2002 | Foody et al. | 709/316 |
| 6,360,230 B1 * | 3/2002 | Chan et al. | 707/103 |
| 6,385,496 B1 * | 5/2002 | Irwin et al. | 700/87 |
| 6,397,384 B1 * | 5/2002 | Briggs | 717/165 |
| 6,487,714 B1 * | 11/2002 | Azagury et al. | |

FOREIGN PATENT DOCUMENTS

| | | |
|---|---|---|
| EP | 0 664 510 | 7/1995 |
| EP | 0 757 313 | 2/1997 |

* cited by examiner

Primary Examiner—Thomas Lee
Assistant Examiner—George Lawrence Opie
(74) Attorney, Agent, or Firm—Gregory M. Doudnikoff

(57) ABSTRACT

A computer implemented method of defining an object union in an object oriented programming environment, comprising the steps of: selecting a first class from which a first object to be contained in the object union will be instantiated at runtime; selecting a second class from which a second object to be contained in the object union will be instantiated at runtime; selecting a policy function for operating on the first and second classes, at runtime, in order to define which methods supported by the first and second classes will be accessible via the object union at runtime.

6 Claims, 1 Drawing Sheet

DATA PROCESSING WITH POLICED OBJECT UNION

FIELD OF THE INVENTION

This invention relates to the data processing field. More specifically, this invention relates to Object Oriented Programming environments.

BACKGROUND OF THE INVENTION

The development of the EDVAC computer system of 1948 is often cited as the beginning of the computer era. Since that time, computer systems have found their way into just about every aspect of the American life style. One reason for this proliferation is the ability of computer systems to perform a variety of tasks in an efficient manner. The mechanisms used by computer systems to perform these tasks are called computer programs.

Like computer systems themselves, the development of computer programs has evolved over the years. The EDVAC system used what was called a "one address" computer programming language. This language allowed for only the most rudimentary computer programs. By the early 1950s, scientists had developed mechanisms which could convert symbolic instructions that were reasonably understandable to humans into a form which could be understood by a computer system. Each computer system was designed to handle a specific group of these instructions. These groups of instructions are called instruction sets.

The next step in the development of computer programs was the notion of computer programming languages. Computer programming languages were even more understandable than symbolic instruction sets. Computer programs are written using a variety of computer programming languages. Once written, a computer program is compiled into instructions that are part of the instruction set of a particular computer system. FORTRAN is usually cited as one of the first languages to allow computer programs to be written independently of a particular instruction set. By the 1960s, improvements in computer programming languages led to computer programs that were so large and complex that it was difficult to manage and control their development and maintenance.

Hence, in the 1970s, focus was directed away from developing new programming languages towards the development of programming methodologies and environments which could better accommodate the increasing complexity and cost of large computer programs. One such methodology is the Object Oriented Programming (OOP) approach. OOP advocates claim that this approach to computer programming can improve the productivity of computer programmers by as much as twenty-five fold. Hence, while it has been some time since the OOP concept was originally developed, it is currently seen as the way of the future.

The two fundamental concepts of OOP are "encapsulation" and "reusability." Encapsulation means that information and the means for using the information are conceptually packaged into individual entities called "objects." The objects represent individual operations or groups of operations that can be performed by a computer system. The information contained in an object is called data and the means used to perform a particular operation upon the information is called a method. The idea of reusability is that the objects are made sufficiently generic so that they can be used by the methods of many other objects. Any program or method program that uses an object is said to be a client of that object (i.e., a client program). The client will call or invoke the object while specifying the method that is to be used. This is called method resolution.

Objects are also considered to be members of a particular "class" of objects. When objects are created they may be members of a particular class or they may be considered to be members of a subclass of a particular class. Objects that are created as members of a subclass are said to have "inherited" the characteristics (i.e., the data and methods) of the class to which they are a subclass (i.e., their super class). For example, consider a class of objects called Canine. The class will have data that describes objects of that class (i.e., name, colour, number of eyes and legs, etc.) The class will also have methods defined which can be used to work with the data of the class. For example, an object of class Canine could be an object that represented a canine named REX that was black and had two eyes and four legs. A subclass of class Canine, class Dog, could further define class Canine to include data that indicated what type of canine Was involved. For example, an object of class Dog could be created that represented a dog named Lassie that was white and brown, had two eyes, four legs, and was of type Collie. Class Canine would also, then, be considered a super class of class Dog. As objects and subclasses are added, a hierarchical tree structure is created. Each class, be it respectively referred to as a subclass or super class, is considered to be at a certain level in the hierarchical structure. In the example, class Dog, as a subclass of class Canine, would be at a level one greater than that of class Canine.

According to the present state of the art, e.g., the Interface Definition Language (IDL) or Microsoft's COM (Common Object Model)/ActiveX/OLE (Object Linking and Embedding), when an object is being defined all of the methods which this object supports are embedded in a text file which is then used to generate Object Method templates.

It is very common to define one object (e.g., object AX) as containing other objects (e.g., objects B1 and B2). AX is then known as an object union of B1 and B2. When this is done, all of the methods that are publicly available in B1 and B2 become also publicly accessible from AX. That is, if object B1 supports methods m,n,o,p and object B2 supports methods k,l,m,n then an external object can make method calls on AX using the following methods: B1.m, B1.n, B1.o, B1.p, B2.k, B2.1, B2.m, B2.n. However, oftentimes it is advantageous to define AX so that only some of the B1 and/or B2 methods are publicly accessible via AX. For example, for reasons of security or performance it may be required that only methods whose names are common to B1 and B2 be publicly accessible via AX.

The usual way this restriction has been carried out according to the present state of the art is to create a subclass c1 of B1 and a subclass C2 of B2, such subclasses hiding the undesired implementations and methods. However, this involves a compile or definition time activity and thus the inventors have found that this includes inflexible limitations, such as a high degree of programming redundancy in order to obtain the desired methods.

Specifically, there are several areas of programming where such a dynamic inheritance is useful. Consider the case where an Object is to have different behaviours based on some criteria, for example, time. We call this object the DayNight Object which is instantiated from a Class called DayNightClass (the concept of Class Factories is not relevant to this discussion). The object has a given behaviour during working hours, but another behaviour during the night.

Under the OO programming technique now widely used, this Object would normally be instantiated from two different Classes: Day and Night. This would mean that two new Classes are setup, both inheriting from the DayNightClass: DayFromDayNightClass and NightFromDayNightClass; both of these derived Classes contain the same methods—it is the implementation that differs. Thus, the application program has to instantiate a DayFromDayNightClass or a NightFromDayNightClass object.

The logic for determining whether a Day Object or a Night Object is to be instantiated, therefore, lies in the application that creates the Object. According to a pure view of the Object Oriented paradigm, this is the wrong place for a decision to be made about the function of the Object—it is the Object itself that should determine its mode of operation. The present invention presents a technique for removing this corruption of the pure OO paradigm.

Another technique is to supply a parameter at instantiation time. This permits the instantiation of a DayNightClass object to always be performed, with the instantiation parameter being saved within the instantiated Object to govern subsequent behaviour. Again, this reduces the complexity of actually getting an Object to exhibit dynamic behaviour. The drawback with this technique is that it permits Objects to exhibit variable behaviours based on information captured at instantiation time, but then behaviour is fixed for the lifetime of the Object existence. This may be either a good thing or a bad thing depending upon what flavour of OO purity is adopted, but it presents an inflexible design and thus does not provide the degree of flexibility that the present invention addresses.

What is really required is a way for an Object to exhibit different behaviours based on decisions taken within the Object itself. The external environment may provide information or hints as to the operation, but it is up to the Object itself to determine its behaviour.

In the aforementioned DayNightClass, it is clearly better for an Object instantiated from the DayNightClass to decide whether it is running during the Day or the Night and alter it's behaviour accordingly. This decision may be based on external information like the Time or TimeZone or Date (Night begins early on Friday and lasts until Monday morning), but the decision is made by the Object, not the instantiator.

It is even more desirable that when running during the Night, methods related purely to Daytime actions do not exist. The only way this can be performed is for these latter methods always to exist, but when being executed return a user-defined exception (or bad Return Code) during the Night. It would be much more desirable (from the viewpoint of application coding) if the method did not actually exist when it could not be executed. The present invention provides such a mechanism.

If we consider that an Object is making these sorts of decisions, it is clearly required for the Object itself to decide which functions are executed as the result of a method call. For example, if there was a public method called Charge then private versions called ChargeDay and ChargeNight would be provided. When the public Charge Method is invoked, then this Charge Method would dispatch the call to either the private ChargeNight or private ChargeDay method to do the calculation. This is the only currently workable way to accomplish execution of either ChargeDay or ChargeNight in response to the externally visible Charge method when the instantiated Object is making runtime execution decisions.

To accomplish the function in ChargeDay or ChargeNight, the DayNight Class has to inherit all of the associated requirements for both the ChargeDay and ChargeNight methods. This is a fixed requirement of the OO inheritance paradigm. Problems then arise if the inheritance requirements for ChargeDay conflict with those for ChargeNight. These commonly relate to namespace clashes (such as LHS and RHS inheritance as discussed later on), but can be more fundamental if actual implementation requirements require completely incompatible inheritance trees. In this case, the ChargeDay and ChargeNight private methods cannot be implemented within the same instantiated Object, and so the required function cannot be provided. This patent removes this restriction.

The OO inheritance design also has an implicit assumption that all publicly exposed methods are accessible by the user of the instantiated object. Any security processing that exists is performed at instantiation time (whether or nor the current user/security context can create the object) and it is left to the methods themselves to police accessibility when executed. This arrangement leads to a security exposure in that all the methods are available to a user—whereas what is required is that only methods available for execution are visible (unauthorised methods are not visible and so not discoverable).

This hiding of methods based on Security Context (or other information available at Object instantiation time) is not supported under current OO implementation. All public methods are always available. Consequently, there is a security exposure or an assumption that instantiation-time security is all that is needed. The present invention addresses this area and removes the security exposure.

Thus, the problem with current OO definitions is that inheritance and method visibility has to be fixed at compile (or Interface Definition Language) time, whereas what is required is that these decisions be postponed until execution time; and that this execution time decision is dynamic. By actually controlling the contents of an instantiated object whenever it is accessed the present invention provides the required degree of flexibility for security and functional purposes.

SUMMARY OF THE INVENTION

According to one aspect, the present invention provides a computer implemented method of defining an object union in an object oriented programming environment, comprising the steps of: selecting a first class from which a first object to be contained in the object union will be instantiated at runtime; selecting a second class from which a second object to be contained in the object union will be instantiated at runtime; selecting a policy function for operating on the first and second classes, at runtime, in order to define which methods supported by the first and second classes will be accessible via the object union at runtime.

According to a second aspect, the invention provides a computer program product, stored on a computer readable storage medium for, when run on a computer system, instructing the computer system to carry out the method steps of the first aspect.

According to a third aspect, the invention provides a data processing apparatus for carrying out the method steps of the first aspect.

Thus, with the present invention, an object union is defined, where the selection of which methods of the contained objects are accessible via the object union is made dynamically at runtime.

BRIEF DESCRIPTION OF THE DRAWINGS

The present invention will be better understood by the below detailed description of the preferred embodiments thereof, which refer to the following drawing figure.

DETAILED DESCRIPTION OF THE PREFERRED EMBODIMENTS

Figure 1:
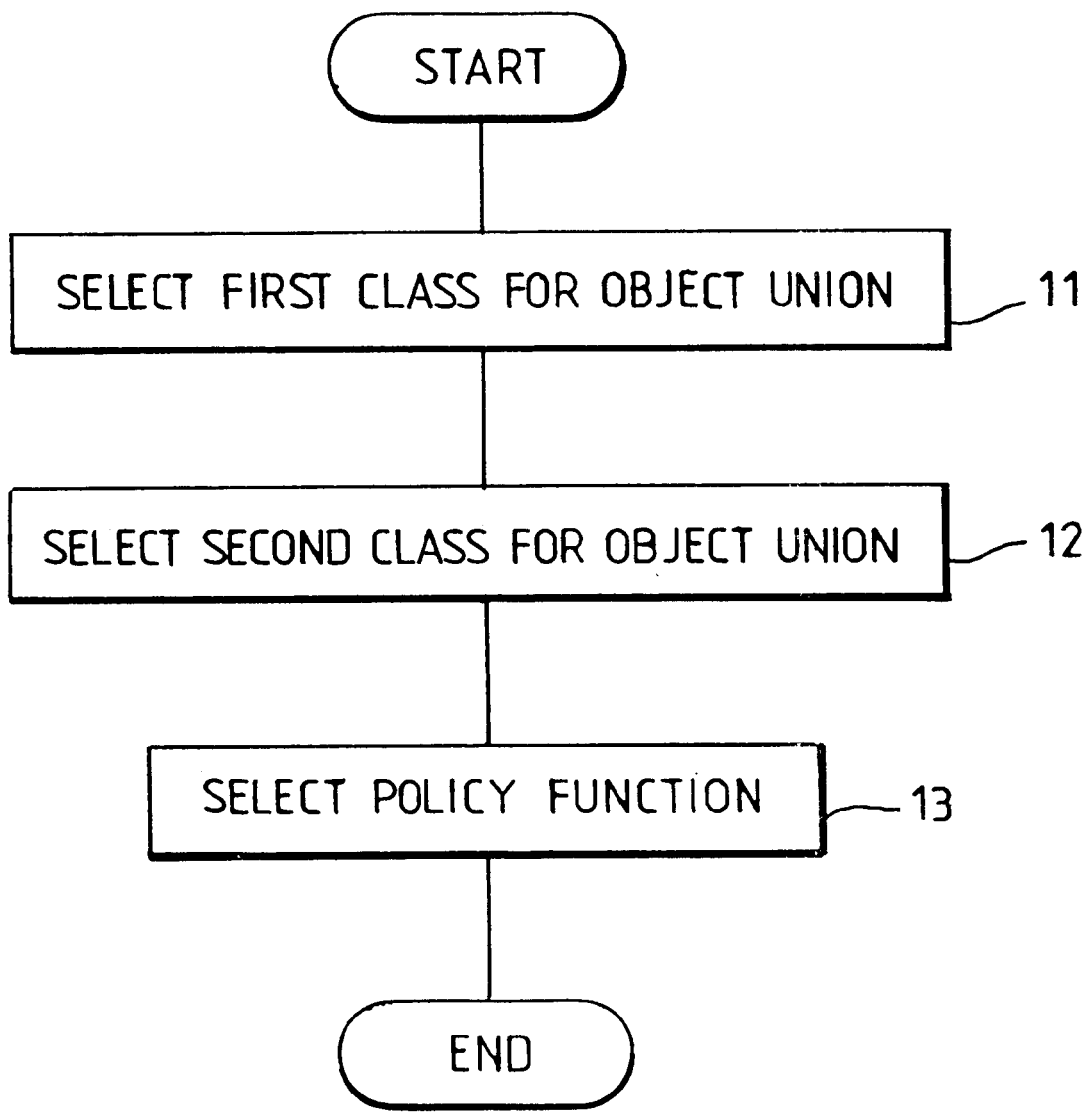
FIG. 1 is a flowchart showing the steps involved in defining an object union, according to a preferred embodiment of the present invention.

Objects are constructed, in general, by the "new" operator:

X=new(y) creates an instance of an object whose class is y and puts its reference into the variable X. The preferred embodiment of the present invention proposes a novel new operator called "newpolice" which is used to create an object union.

Consider Z=newpolice(X, policy, Y) X and Y are both classes which are to be instantiated together and whose Object reference is returned in the variable Z (and thus, Z is an object union of objects X and Y. The visibility of the methods within classes X and Y is controlled by the "policy" function. Therefore, the newpolice operator provides access restriction to the methods of the instantiated X and Y class methods at runtime—so obviating the need for compile time sub-classing.

The newpolice operator can be used to avoid compile and language restrictions over LHS (left hand side) and RHS (right hand side) tree inheritance of methods, as this resolution is now under runtime program control—sometimes it might be desirable to use the LHS tree and sometimes the RHS tree—so avoiding the need for compile and definition time redundancy in order to obtain the correct methods.

RHS and LHS tree inheritance method resolutions are techniques used to resolve ambiguous references to inherited items.

Consider (in pseudo-c++):
   Class A {public: void m(void)};
   Class B1: public A {public void p( )};
   Class B2: public A {public void q( )};
   Class C: public B1, public B2 { };

In this example, an instance of an object of Class C inherits all public methods from classes B1 and B2, which in turn inherit all public methods from Class A. Consequently, in Class C at compile time we have two methods called m available—one from the B1 inheritance tree and the other from the B2 inheritance tree—along with methods p and q.

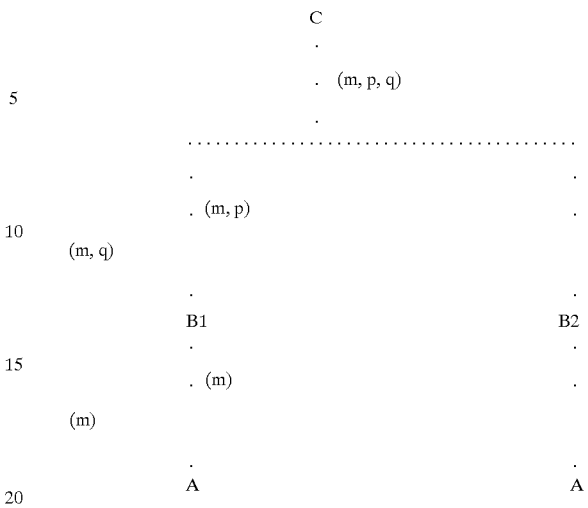

The question then arises as to which version of m gets dispatched when a call to the m method of C is executed: the one via B1 or the one via B2? The LHS inheritance rule (most commonly used) uses the B1 version, whilst the RHS inheritance rules uses the B2 route. (In this case, the two routes provide identical function, but the example is a simplification of what happens in real life.) Which branch of the inheritance tree used is fixed at compile time (or earlier at IDL generation time).

Using the example given above of object union AX which contains objects B1 and B2, we could have Z=new police ( B1, B2)

where the COMMON function only permits access via the Z object reference to methods whose names are common to the B1 and B2 classes (the 4 methods of B1.m, B2.m, B1.n and B2.n Z=newpolice(B1,LEFTSETINTERSECTION,B2)
yields access only to m n via B1
whereas Z=newpolice(B1,RIGHTSETINTERSECTION, B2)
yields access only to m n via B2
Z=newpolice(B1,SETDIFFERENCE,B2)
permits access to o p (via B1) k l (via B2)

The policy can itself be an evaluated logical expression or exhibit other functional combinations. These types of functions can be used to provide a migration path between older and newer versions of classes or other user-supplied actions. For example, if C1 and C2 are existing and enhanced versions of the same basic class, then you can switch dynamically between implementations at run time by using a policy which accesses external triggers:

Z=newpolice(C1,TRIGGER,C2)
yields access to either the older (C1) or newer (C2) class depending upon some condition (like an environment variable). For example, C1 has methods named t,u,v and C2 also has methods named t,u,v, but the method t (for example) performs a slightly updated function in C2 as compared to its function in C1. The creation of the object union Z using the newpolice operator thus allows Z to switch between the older and newer versions of method t on a dynamic basis at runtime, depending on the value of an environment variable (such as the present date, e.g., use the newer version if the present date, at runtime, is Nov. 1, 1999 or later, otherwise use the older version).

The flowchart of FIG. 1 will now be discussed to illustrate the steps to be carried out in defining an object union, according to a preferred embodiment of the present invention.

At step 11, a first class is selected from which a first object will be instantiated at runtime, the first object is to be contained in the object union. At step 12, a second class is selected from which a second object will be instantiated at runtime, the second object is to be contained in the object union. At step 13, a policy function is selected for operating on the first and second classes, at runtime, in order to define which methods supported by the first and second classes will be accessible via the object union at runtime.

Security restrictions based upon the current authorization context can be applied dynamically at runtime using this newpolice operator. For example, the policy selected for the object union could check the current authorization context and expose certain methods of the contained objects depending on the present state of the authorization context.

Object factories are another common way to create an object, in addition to the "new" operator discussed above. The newpolice operator can also be used with respect to object factories during the creation of an object union.

The invention thus allows runtime policing of an object union thus removing compile times restrictions, while permitting security or other policies to determine access to methods of the object union.

The invention is most particularly suitable for runtime OO languages such as Java, Eiffel or Smalltalk, and with dual interface COM objects or Java objects (as these have method naming information available at runtime).

EXAMPLE 1

An example of the coding will now be provided in order to illustrate the performance benefits achievable with the present invention.

The class under consideration is the implementation of types of cars. We choose to consider how a Fast Car can be differentiated from a Slow Car using the approach of the present invention.

The traditional way of implementing a class of a slow car and a fast car that have the same attributes but different methods uses the techniques of virtual/abstract methods and could be something like:

```
interface motive
{
private int speed ;
private int brake ;
private int aircon;
public int get_speed( )     { return speed} ;
public int get_brake( )     { return brake} ;
public int get_aircon( )    { return aircon} ;
abstract public set_speed(int i ) ;     /* 2 options   max
or unrestricted */
abstract public set_brake(init i) ;     /* 2 options */
abstract public set_aircon(init i) ;    /* 2 options */
} ;
class slowcar implements motive
{
public set_speed(int i) { it i < 99 then speed=i} ;
public set_brake(int i) { if i < 10 then brake = i} ;
public set_aircon(int i) { if i < 23 then aircon = i} ;
}
```

```
class fastcar implements motive
{
public set_speed(int i) {speed =i} ;
public set_brake(int i) {brake =i} ;
public set_aircon(int i) {aircon=i} ;
}
```

The question then arises, for example, as to how can one define a type of vehicle that goes at a slow speed but has unrestricted brakes and unrestricted aircon (a tractor). The traditional way to do this is to define yet another derived class:

```
class tractor implements motive
{
public set_speed(int i)  { if i < 99 then speed =i} ;
public set_brake(int i) {bake =i} ;
public set_aircon(int i)  {aircon=i} ;
}
```

Therefore, to cover all possibilities we must define $2^n$ methods, which in our 3 attribute example will require a total of 8 methods to be written to cover the restricted/unrestricted combinations.

Using NEWPOLICE in static mode (rhs operator overrides names from lhs with those from rhs of the command, so using different function), we would solve the above as follows:

```
class vehicle     /* all set methods restricted */
{
private int speed ;
private int brake ;
private int aircon;
public int get_speed( )      { return speed} ;
public int get_brake( )      { return brake} ;
public int get_aircon( )     { return aircon} ;
public set_speed(int i) { if i < 99 then speed =i} ;
public set_brake(int i) {if i < 10 then brake =i} ;
public set_aircon(int i) {if i < 23 then aircon=i} ;
} ;
class speed_all { public set_speed(int i) { speed =i} ; }
class speed rest_rest {public set_speed(int i) { it i < 99
then speed =i} ;
class brake_all { public set_brake(int i) { brake =i} ; }
class brake_rest {public set_brake(int i)  { if i < 10
then brake =i} ; }
class aircon_all { pubiic set_aircon(int i) { aircon =i} ;
}
class aircont_rest {public set_aircon(int i) { if i < 23
then aircon =i} ; }
```

So we have reduced the class into order n from nCm resulting in a savings in the amount of code.

For a traditional use of slowcar=new(vehicle)
Use of the present invention codes:
Slowcar=newpolice(vehicle,rhs,speed_rest,rhs,brake_rest,r hs,aircon_rest)
Which yields methods of

```
set_speed(int i) {if i < 99 then speed =1} ;
set_brake(int i) {if i < 10 then brake-i} ;
set_aircon(int i) {if i < 23 then aircon=i} ;
```

For a fast car we would code
   fastcar=
newpolice(vehicle,rhs,speed__all,rhs,brake__all,rhs,aircon__all)
   =>

```
set_speed(int i) {speed =i} ;
set_brake(int i) {brake=i} ;
set_aircon(int i) {aircon=i} ;
```

For a tractor we would code
   tractor=
newpolice(vehicle,rhs,brake__all,rhs,aircon__all)

```
set_speed(int i) { if i < 99 then speed =i} ;
set_brake(int i) {brake=i} ;
set_aircon(int i) {aircon=i} ;
```

And my__car would be
   my__car=newpolice(vehicle,rhs,speed__all)
   =>

```
set_speed(int i) {speed = i } ;
set_brake(int i) {if i < 10 then brake=i} ;
set_aircon(int i) {if i < 23 then aircon=i} ;
```

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

We claim:

1. A computer implemented method of defining an object union in an object oriented programming environment, the object union supporting an object union method which may be called from an entity outside of the object union, said method comprising the steps of:

selecting a first class from which a first object to be contained in the object union will be instantiated at runtime, the first object supporting a first method which is a first implementation of the object union method;

selecting a second class from which a second object to be contained in the object union will be instantiated at runtime, the second object supporting a second method which is a second implementation of the object union method; and selecting a policy function for operating on the first and second classes, at runtime, in order to dynamically, depending on a current condition, select either the first implementation of the object union method or the second implementation of the object union method, in response to the object union receiving a method call on the object union method from the entity outside of the object union.

2. The method of claim 1 wherein the second class is an updated version of the first class.

3. The method of claim 2 wherein the policy function checks the value of an environment variable at runtime to determine whether a method of the first class or a method of the second class is selected in response to receiving a method call on a method having a name which is shared by the first class and the second class.

4. The method of claim 1 wherein the object-oriented programming environment is a Java environment.

5. A computer program product, stored on a computer readable storage medium for, when run on a computer system, instructing the computer system to carry out the method steps of claim 1.

6. A data processing apparatus for defining an object union in an object oriented programming environment, the object union supporting an object union method which may be called form an entity outside of the object union, said apparatus comprising:

means for selecting a first class from which a first object to be contained in the object union will be instantiated at runtime, the first object supporting a first method which is a first implementation of the object union method;

means for selecting a second class from which a second object to be contained in the object union will be instantiated at runtime, the second object supporting a second method which is a second implementation of the object union method; and means for selecting a policy function for operating on the first and second classes, at runtime, in order to dynamically, depending on a current condition, select either the first implementation of the object union method or the second implementation of the object union method, in response to the object union receiving a method call on the object union method from the entity outside of the object union.

* * * * *